June 25, 1940.   L. J. RAUCH ET AL   2,205,862
COWL FASTENER
Filed April 13, 1939

INVENTORS
LOUIS J. RAUCH
PHILIP RAUCH
BY Hammond & Littell
ATTORNEYS

Patented June 25, 1940

2,205,862

UNITED STATES PATENT OFFICE 2,205,862

COWL FASTENER

Louis J. Rauch and Philip Rauch, Brooklyn, N. Y.

Application April 13, 1939, Serial No. 267,725

7 Claims. (Cl. 24—221)

This invention relates to new and improved fastening devices which possess general utility but are adapted particularly for use in holding cowling, or cowl sheets, to the body structures of aeroplanes.

Numerous types and constructions of fasteners are known which embody mating fastening elements attached to two parts to be fastened together, along with means for resiliently but releasably holding the parts in fastened relation. Some of the known fasteners may be used satisfactorily as cowl fasteners, but in all cases of which we are aware the known fasteners possess one or more undesirable characteristics. Although the problem of fastening a cowl sheet to an aeroplane body structure may seem to be a simple one, in practice there are many special conditions in this field of work which impose exacting requirements on the type of fastener to be employed. It is difficult to provide fasteners of the requisite strength, safety and serviceability which also may be manufactured, installed and used easily and economically. Thus, one type of fastener may meet all safety and service requirements but be hard to assemble properly; another may meet safety, service and assembly requirements but involve excessive manufacturing costs; another may cause troubles in service due to difficulties in engaging or disengaging the fastening elements, or to lack of resistance to transverse strains, or to other causes such as lack of continuous positive engagement between the mating elements or lack of positive means to indicate when the elements are safety interlocked.

In the present state of the art a need still exists for a cowl fastener embodying an optimum combination of strength, safety, serviceability, simplicity of manufacture, assembly and use, and low cost to the user, and it is the principal object of our invention to provide such a fastener.

Another object of our invention is to provide a fastener which is positive and foolproof in operation yet is constructed to permit ample tolerances in assembly and use, so that too accurate "jigging" is not required for certainty of operation and so that the fastening elements easily may be placed in operable position and locked together in cases where the cowl sheet, because of slight bending or bowing or other cause, might otherwise interfere with proper engagement of the fastening elements.

Another object of our invention is to provide a fastener including disengageable fastening elements which are positively held in fastened relation in a manner resisting strains in all directions, together with means definitely indicating when the elements are engaged and means preventing the elements from remaining in an unsafe, partially engaged relation.

A further object of the invention is to provide a fastener including disengageable fastening elements which are constructed so as to move together smoothly during movement of one part to be fastened toward the other, and so as to preclude catching or improper locking of the fastening elements during disengagement thereof and separation of the parts.

Another object of the invention is to provide a fastener for cowling or the like which permits the parts that are to be fastened together to move to a substantially flush position regardless of the relative positions of the fastening elements, thereby ensuring proper registration and ready actuation of all of the fastening elements of a series of elements attached to a common sheet-like member.

A still further object is to provide such fasteners which possess strength and durability more than sufficient to withstand many thousands of engagements, which can be manufactured readily, at a comparatively low cost, without encountering exacting tolerance requirements, and which have a simple and compact construction, of light weight, and a minimum number of parts, all of the parts becoming permanently secured parts of a plane when assembled thereon for use.

The above mentioned and other objects and advantages are realized with the improved fastening devices as disclosed in the present application and set forth particularly in the appended claims. The invention may be fully understood by reference to the following detailed description of a preferred embodiment thereof, when considered in connection with the accompanying drawing, in which:

Figure 4:
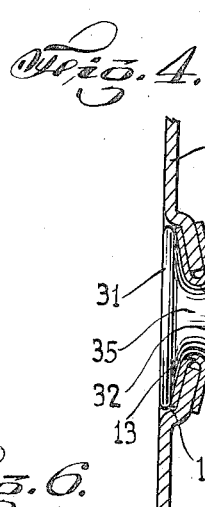
Figure 5:
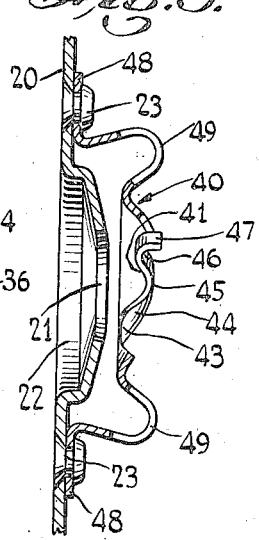
Figure 6:
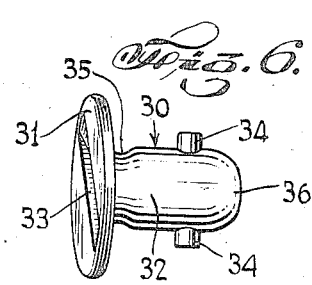

Figures 4 and 5, respectively, are side views, partly in section, showing the male and female fastening elements as assembled for use; and Figure 6 is a perspective view of the male fastening element.

As illustrated in the drawing, the structure at 10 constitutes a part of the cowling, or one part to be fastened, and the structure at 20 is part of the aeroplane wall, or a second part to which the first part is to be fastened. The fastener comprises a male element 30 secured, for example, to the first part 10, and a female element 40 secured to the second part 20. In assembly, the male element 30 is permanently secured to part 10 in a manner permitting turning movement, while element 40 is permanently secured to part 20.

The male element 30 is constructed in the form of a pin having a head 31 lying on the outer side of part 10, a shank 32 extending through and beyond an aperture in part 10, and a pair of transverse arms 34, the shank and arms being substantially in the form of a T.

Figure 2:
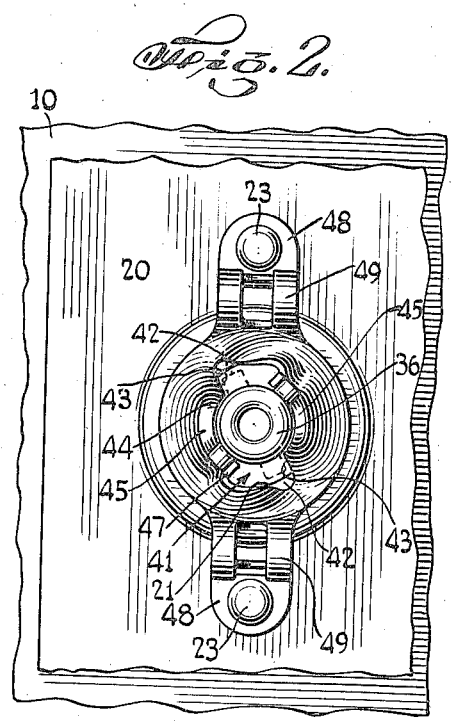
Figure 2 is a plan view showing the inside of the structure illustrated in Figure 1.

The female element 40 consists of a strip of resilient metal providing a central aperture 41 in registration with an aperture 21 in part 20, which in turn registers with aperture 11. The metal defining aperture 41 is formed to provide oppositely disposed elongations or entrances 42 for the arms 34 on pin 30. (See Figure 2.) Bordering each of these entrances is a radially extending cam lip 43 forming the edge of an inclined arcuate cam surface 44. The cams 44 lie in the paths of arms 34 when pin 30 is inserted through aperture 41 and turned clockwise therein. Each cam 44 extends into a hump 45 and, beyond the hump, dips into a groove 46. Beyond at least one of these grooves a stop or ledge 47 is formed integrally with the metal so as to lie in the path of an arm 34 and positively to prevent turning of the pin 30 beyond a predetermined point. The central portion of the strip element 40, that is, the portion adjacent to the central aperture 41, is relatively rigid, and portions between this central portion and the extremities of the strip are resilient or flexible. The resilient portions resiliently hold the central portion in spaced relation to part 20. The extremities of the strip are provided with means by which to attach the element onto part 20; for example, openings are formed therein to accommodate attaching rivets, screws, pins or the like. In practice it is preferred to provide the above-described structure of the central portion and to render it hard and rigid by stamping and deforming a strip of sheet metal and hardening the strip, after which the deformed central portion remains rigid.

Figure 1:
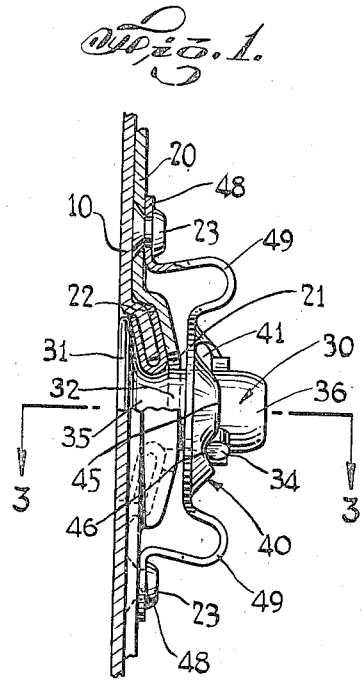
Figure 1 is a side view, partly in section, showing the fastener as assembled on the wall and cowling of an aeroplane, with the fastening elements interengaged.
Figure 3:
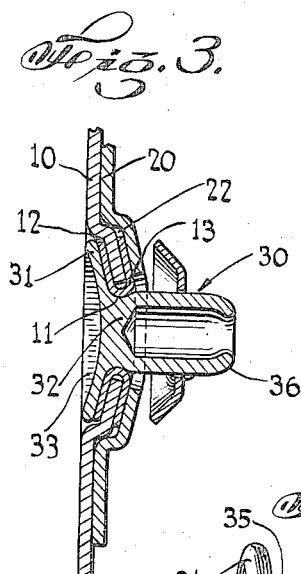
Figure 3 is a cross section taken approximately along the line 3—3 of Figure 1.

It will be understood that a cowl fastener should not project appreciably beyond the outside surface of the cowl sheet, in order to minimize the wind resistance of the plane. As illustrated in Figures 1, 3 and 4, pin 30 preferably is secured to part 10 so that its head 31 lies substantially flush with the outer surface of this part. Thus the metal adjacent aperture 11 is recessed, or "dimpled", to provide a space 12 accommodating head 31, shank 32 of pin 30 is grooved, as at 35, and the pin is secured in place, with its head in space 12, by means of a grommet 13.

In assembly of the female fastening element, part 20 is recessed, as at 22, to receive the dimpled portion of part 10, aperture 21 is formed therein, and appropriate openings are drilled adjacent the recess 22 to accommodate rivets or other attaching means 23. The ends 48 of part 40 are anchored permanently by the rivets 23.

Humps 49 may be included in the resilient or flexible portions of metal strip forming part 40, in order to provide extra play for flexion of the metal.

The fastener embodies additional features rendering it especially suitable for the intended service. In practice, the location of arms 34 and of cams 44, when parts 10 and 20 lie together in the position in which they are to be fastened, is predetermined so that the arms extend through the entrances 42 (see dotted lines in Figure 2), and are sure to turn into the faces of cams 44 at levels intermediate the cam lips 43 and the normal free positions of grooves 46. Thus, when the pin 30 is turned clockwise, for example, by means of a screw-driver or other implement cooperating with a groove 33 in pin head 31, arms 34 engage against cams 44 and move along the same in a manner forcing element 40 and part 20 toward part 10 and causing element 40 to yield when further movement between parts 10 and 20 is resisted. In the course of their movement to engage the fastener, arms 34 must pass over the humps 45. These are formed with relatively sharp angles, so that a strong force is needed to move the arms across the humps and snap them into grooves 46. Moreover, the inclinations of the cam surfaces on both sides of the humps and the resiliency of the strip metal are such that the pin arms can hardly be placed in an intermediate position, but must either be locked securely in grooves 46 or kept at a completely disengaged position. Since a strong turning force is needed to pass the arms over the humps 45 and into the locking groove 46, and since the abutment 47 positively stops movement of the arms beyond the grooves, anyone actuating the fastener is fully apprised of the fact when the elements have been engaged or disengaged, and there is no likelihood of an incomplete actuation which might lead to trouble or damage in service.

Further features of importance to the serviceability of the fastener reside in the construction of the end of pin 30 and the proportionment thereof with respect to the female fastening element and its mounting. In order that pin 30 always move smoothly into the aperture of element 40 and into proper position for engagement of the fastener, the end of the pin is extended beyond arms 34 and provided with a rounded tip 36. By this means, the pin end is guided smoothly and definitely through apertures 21 and 41 when the cowl sheet or other member constituting part 10 is placed in the position in which it is to be fastened; and proper cooperation of the parts is assured even where the cowl sheet has become slightly bent or bowed.

Another feature of the new fastener consists in the construction of the female fastening element 40 with a dished central portion, as seen in Figure 5, which provides space for receiving the arms 34 of the male element 20 and for permitting the parts that are to be fastened together to move into a substantially flush position regardless of the orientation of arms 34 with respect to the entrances 42. By virtue of this novel relationship, a cowl sheet carrying a series of the male fastening elements may be moved flush to an anchoring sheet, with all of the male elements operably associated with their corresponding female elements, without first requiring special turning of the male elements to locate their arms in registration with the cam entrances. Clockwise turning of the male elements when the sheets are substantially flush together results in definite interengagement and fastening of the parts.

It will be noted that the margins of aperture 41 are spaced from the margins of aperture 21 and overlie the latter at certain points. To avoid difficulties which might result from the hanging of arms 34 on the margin of aperture 21, the distance between arms 34 and the extremity of pin 30 is predetermined to exceed the maximum distance between the margins of the two apertures. By virtue of this arrangement the rounded end 36 of pin 30 contacts the female element and prevents arms 34 from becoming caught, regardless of the angle of movement of the pin.

In the manufacture of the improved fastener disclosed herein, pin 30 may be turned out of an integral block of steel, an annulus being left in the plane of arm 34 for subsequent cutting away to leave the arms as integral parts of the pin. The shank of the pin may be bored hollow, as illustrated, and the cylindrical portion of the pin beyond arms 34 may then be pressed into rounded form as shown at 36. This gives an extremely strong male fastening element, at low cost, but at the same time an element of light weight. High strength and wear resistance preferably are ensured by making the pin of a chrome-nickel steel that is hardened after the forming operations.

The female fastening element 40 is preferably made of a quench-hardenable steel, for example, about .9% carbon. A strip of the steel is cut and pressed, or drawn, to the necessary form and then heat-treated and quenched to harden it for use.

The assembly of the fastening elements on an aeroplane or the like may be carried out readily by use of the conventional tools and without requiring special jigging operations which would impair the utility of the fasteners. When assembled, the fastening elements may be positively and securely engaged simply by turning pin 30. Once engaged, the fastener safely resists all forces tending to separate the fastened parts, regardless of the direction of application of the force. The engagement, however, is of a flexible nature, and there is no tendency for the fastener to fracture or break under the severe conditions of use encountered in aeroplane service. Each fastener withstands more than 50,000 actuations without indication of weakness or failure.

We claim:

1. In a cowl fastener, a female fastening element comprising an elongated metal strip adapted to be secured on one side of a support and to cooperate with a rotary pin equipped with radial arms and secured to a member to be fastened to said support, said strip having end portions adapted to be attached to such support, a substantially rigid central portion held in outwardly spaced relation to said end portions, and bowed resilient portions between said central portion and said end portions allowing the former to be forced toward such support against the tension of said resilient portions, said central portion having a central aperture to receive the end of such pin, said central portion also having oppositely disposed portions defining radial elongations of said aperture and adapted to admit the radial arms of such pin, the marginal portions defining said aperture and said elongations being shaped to provide a permanently rigid shape dished outwardly with respect to the adjacent sides of said strip, said shape providing rigid cam and seat means for interlocking engagement with such radial arms in response to turning movement of said pin.

2. In a cowl fastener, a female fastening element comprising an elongated metal strip adapted to be secured to one side of a support and to cooperate with a rotary pin equipped with radial arms and secured to a member to be fastened to said support, said strip having end portions adapted to be attached to such support, a substantially rigid central portion held in outwardly spaced relation to said end portions, and bowed resilient portions between said central portion and said end portions allowing the former to be forced toward said support against the tension of said resilient portions, said central portion having a substantially circular central opening to receive the end of such pin, said central portion also having oppositely disposed portions defining radial elongations of said opening and adapted to admit the radial arms of such pin, the marginal portions defining said opening and said elongations being shaped to provide a permanently rigid shape dished outwardly with respect to the adjacent sides of said strip, said shape providing inwardly facing cam lips at corresponding sides of said elongations, inclined arcuate cams extending outwardly from said cam lips along the margin of said opening for guiding said pin arms onto said central portion and forcing the latter toward said support in response to turning movement of such pin, each of said cams terminating in a distinct hump, and radial grooves adjacent said humps below the level thereof to receive and hold the arms under tension when the same have been turned beyond said humps.

3. A fastening element as described in claim 2, said marginal portions being shaped to provide also an integral abutment projecting upwardly therefrom adjacent each of said grooves to prevent turning of the pin arms beyond said grooves.

4. In a fastener for cowling or the like, a female fastening element comprising an elongated bowed strip of sheet metal having a rigid central portion and resilient portions between said central portion and the extremities of the strip, said central portion having a central aperture and oppositely disposed portions defining radial elongations of said aperture and adapted to receive the end portion and radial arms, respectively, of a cooperating rotary male fastening element, the metal at one side of each of said elongations providing an inwardly directed cam lip, a pair of oppositely disposed inclined arcuate cam portions bordering said aperture on the upper face of said central portion, each of said cam portions extending outwardly from one of said cam lips and leading to a groove disposed radially with respect to said aperture and each cam portion comprising a distinct hump next to the corresponding groove and projecting above the metal adjacent thereto.

5. In a fastener for cowling or the like, a female fastening element comprising an elongated bowed strip of stamped and hardened sheet metal having a central portion made rigid by deformation and resilient portions between said central portion and the extremities of the strip, said central portion having a central circular aperture and oppositely disposed portions defining radial elongations of said aperture and adapted to receive the end portion and radial arms, respectively, of a cooperating rotary male fastening element, the metal at one side of each of said elongations providing an inwardly directed cam lip, a pair of oppositely disposed inclined arcuate cam portions bordering said aperture on the upper face of said central portion, each of said cam portions extending outwardly from one of said cam lips and leading to a groove disposed radially with respect to said aperture, each cam portion comprising a distinct hump defining one side of its corresponding groove and projecting above the metal adjacent thereto, and an integral abutment projecting upwardly from the metal bordering said aperture on the other side of each groove to prevent turning movement of a pin arm therebeyond.

6. In a fastener for cowling or the like, a fastening element comprising an elongated strip of stamped and hardened sheet metal having a rigid central portion with an aperture adapted to receive a cooperating rotary fastening element, resilient portions between said central portion and the end portions of said strip, and means adjacent said end portions adapted to be attached to a part to be fastened, said central portion being drawn and rigid in all directions around the margins of said aperture and the marginal portions thereof defining said aperture being deformed to provide rigid cam and seat means for interlocking engagement with fastening means on such rotary fastening element in response to turning movement of the latter.

7. In a fastener for cowling or the like, a fastening element comprising an elongated strip of stamped and quench-hardened sheet steel having a rigid central portion with an aperture adapted to receive a cooperating rotary fastening element, said central portion having oppositely disposed portions defining radial extensions of said aperture to admit radial arms of said rotary element, resilient portions between said central portion and the end portions of said strip and means adjacent said end portions adapted to be attached to a part to be fastened, said central portion being drawn and rigid in all directions around the margins of said aperture, the marginal portions thereof defining said aperture being deformed to provide oppositely disposed, inclined rigid cams extending outwardly from corresponding sides of said radial openings, rigid humps at the tops of said cams, oppositely disposed rigid radial grooves next to said humps for receiving and holding such radial arms, and oppositely disposed rigid abutments next to said grooves to prevent rotation of said arms beyond said grooves, the path of rotation between the axis of said openings and the axis of said grooves covering an angle substantially greater than 90°.

LOUIS J. RAUCH,
PHILIP RAUCH.